(12) United States Patent
Anderson et al.

(10) Patent No.: US 11,536,120 B2
(45) Date of Patent: Dec. 27, 2022

(54) DOWNHOLE FLOW CONTROL DEVICES AND METHODS

(71) Applicant: Swellfix UK Limited, Aberdeenshire (GB)

(72) Inventors: James Anderson, Westhill (GB); Annabel Green, Huntly (GB)

(73) Assignee: SWELLFIX UK LIMITED, Aberdeenshire (GB)

( * ) Notice: Subject to any disclaimer, the term of this patent is extended or adjusted under 35 U.S.C. 154(b) by 0 days.

(21) Appl. No.: 17/252,807

(22) PCT Filed: Jun. 19, 2019

(86) PCT No.: PCT/GB2019/051721
§ 371 (c)(1),
(2) Date: Dec. 16, 2020

(87) PCT Pub. No.: WO2019/243815
PCT Pub. Date: Dec. 26, 2019

(65) Prior Publication Data
US 2021/0262326 A1    Aug. 26, 2021

(30) Foreign Application Priority Data

Jun. 19, 2018   (GB) ..................................... 1810080

(51) Int. Cl.
*E21B 43/12* (2006.01)
*E21B 34/08* (2006.01)
*E21B 43/16* (2006.01)

(52) U.S. Cl.
CPC .............. *E21B 43/12* (2013.01); *E21B 34/08* (2013.01); *E21B 43/16* (2013.01)

(58) Field of Classification Search
CPC ........... E21B 43/12; E21B 43/16; E21B 34/08
See application file for complete search history.

(56) References Cited

U.S. PATENT DOCUMENTS

| 996,600 A | 6/1911 | Stotts |
| 2,063,821 A | 12/1936 | Mckenzie |

(Continued)

FOREIGN PATENT DOCUMENTS

EP    2607613 A1    6/2013

OTHER PUBLICATIONS

International Search Report PCT/ISA/210 for International Application No. PCT/GB2019/051721 dated Nov. 5, 2019.

(Continued)

*Primary Examiner* — Aaron L Lembo
(74) *Attorney, Agent, or Firm* — Harness, Dickey & Pierce, P.L.C.

(57) ABSTRACT

Described is a flow control device comprising a body locatable with a tubular and a flow regulator, housed within the body. The flow regulator defines a flow path through the body to accommodate flow between internal and external locations of a tubular in use. The flow regulator comprises a valve arrangement forming part of the flow path, and a biasing mechanism configured to urge the valve arrangement towards an open configuration from a restricted configuration in which fluid flow though the flow path is restricted. The biasing mechanism and the flow path through the flow control device are configured such that a differential pressure acting across the flow regulator, in excess of a particular threshold, moves the valve arrangement from the open configuration towards the restricted configuration in order to limit flow through the flow control device.

16 Claims, 7 Drawing Sheets

(56) References Cited

U.S. PATENT DOCUMENTS

| | | | |
|---|---|---|---|
| 2,307,016 A | | 1/1943 | Boynton |
| 2,624,362 A | | 1/1953 | Church |
| 3,381,708 A | | 5/1968 | Chenoweth |
| 3,741,241 A | | 6/1973 | Jackson |
| 5,934,329 A | * | 8/1999 | Perrone, Jr. ......... F16K 17/1606 |
| | | | 138/30 |
| 9,353,607 B2 | * | 5/2016 | Hallundbæk ............. F16K 7/17 |
| 10,605,046 B2 | * | 3/2020 | Ismail .................... E21B 43/12 |
| 2012/0305243 A1 | | 12/2012 | Hallundbæk et al. |

OTHER PUBLICATIONS

Written Opinion PCT/ISA/237 for International Application No. PCT/GB2019/051721 dated Nov. 5, 2019.
Great Britain Search Report for GB Application No. 1810080.0 dated Nov. 26, 2018.
International Report on Patentability and Written Opinion for PCT/GB2019/051721 dated Dec. 30, 2020.

* cited by examiner

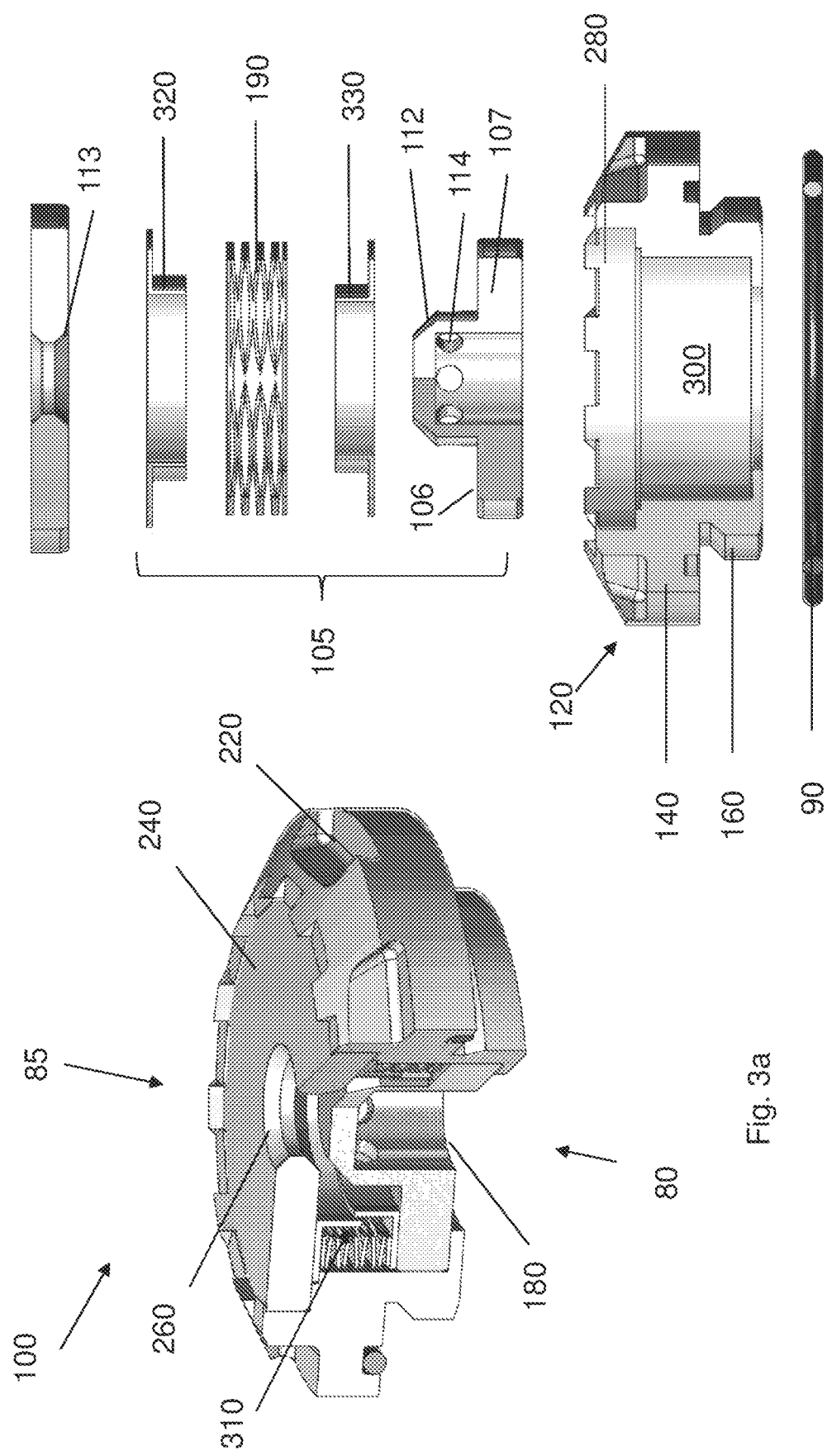

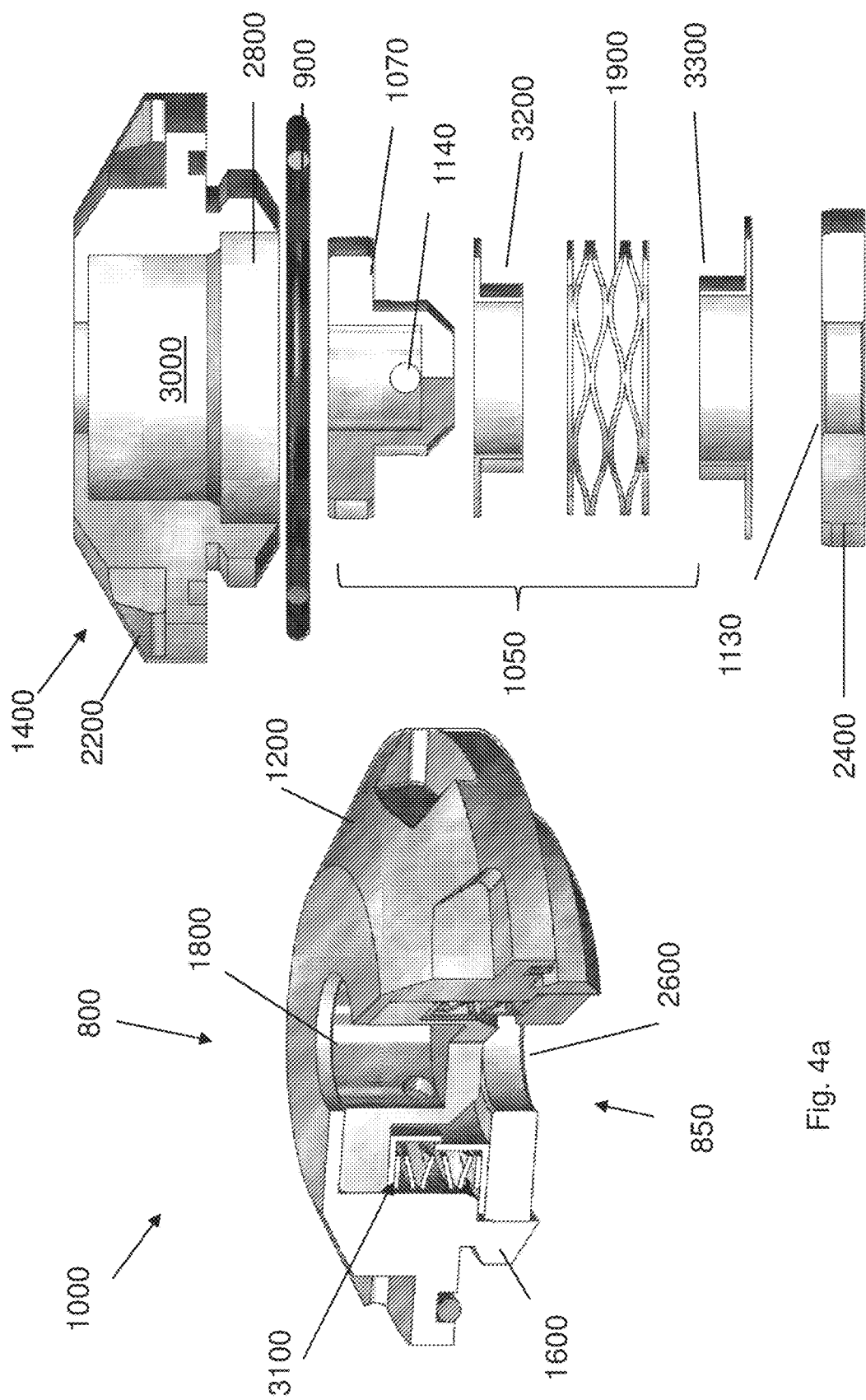

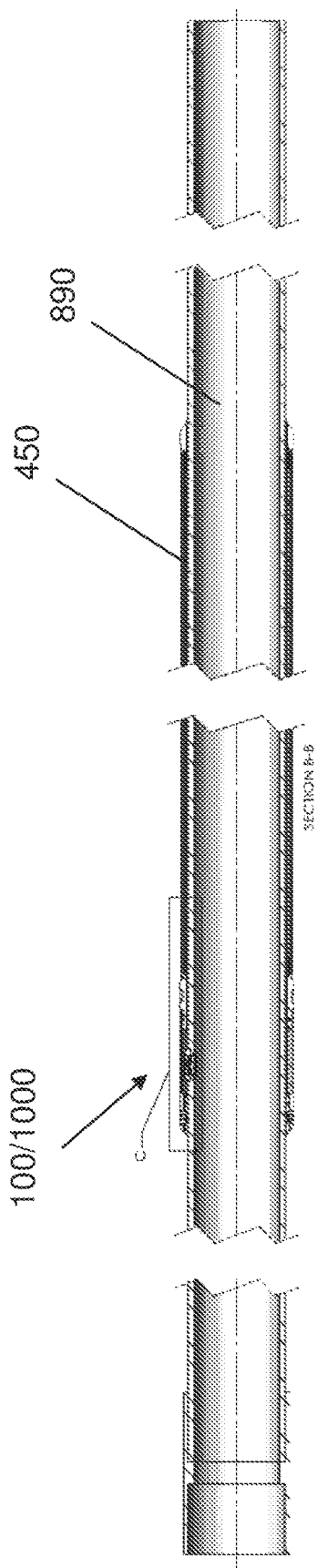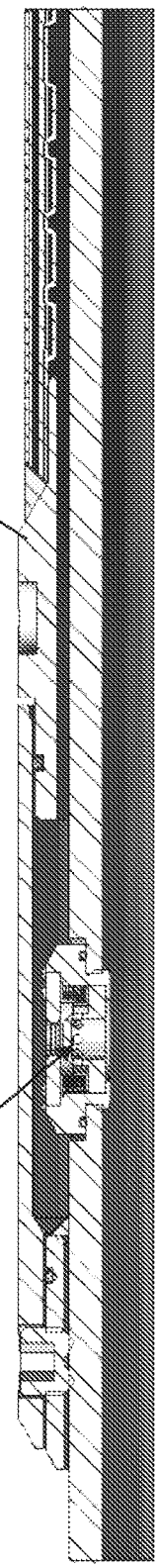
Fig. 5a
Fig. 5b

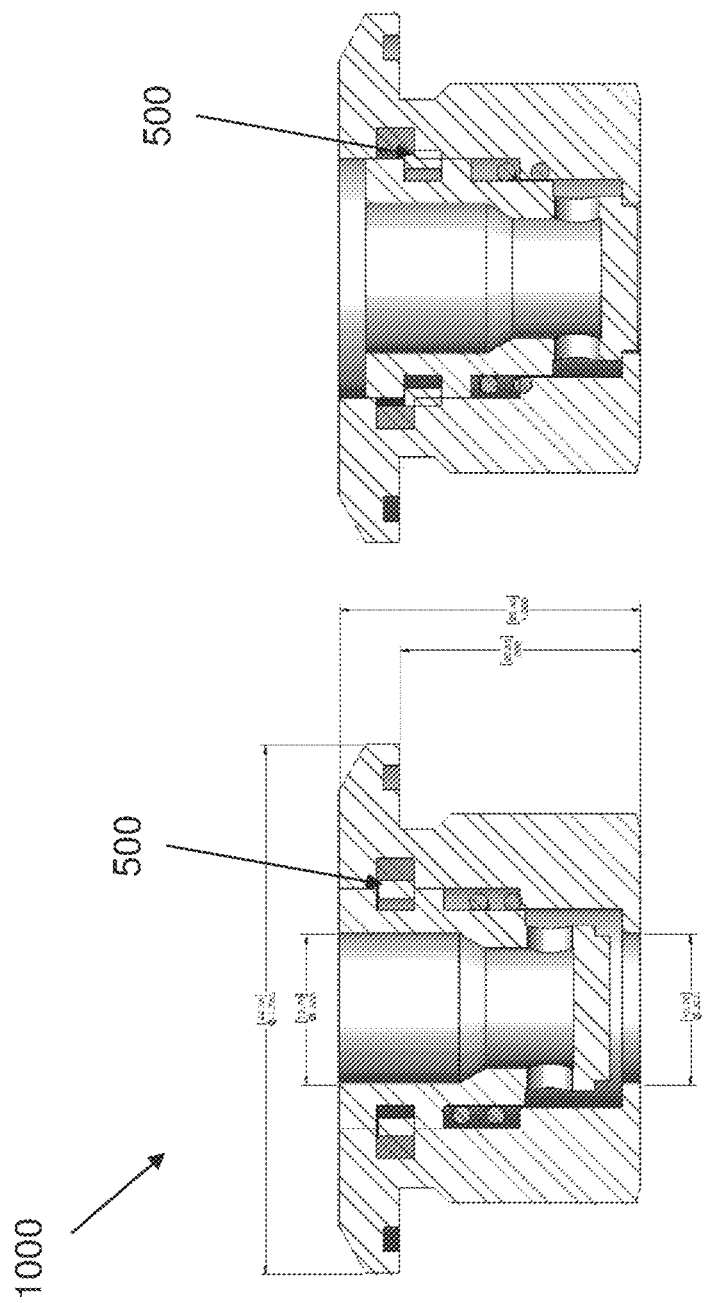

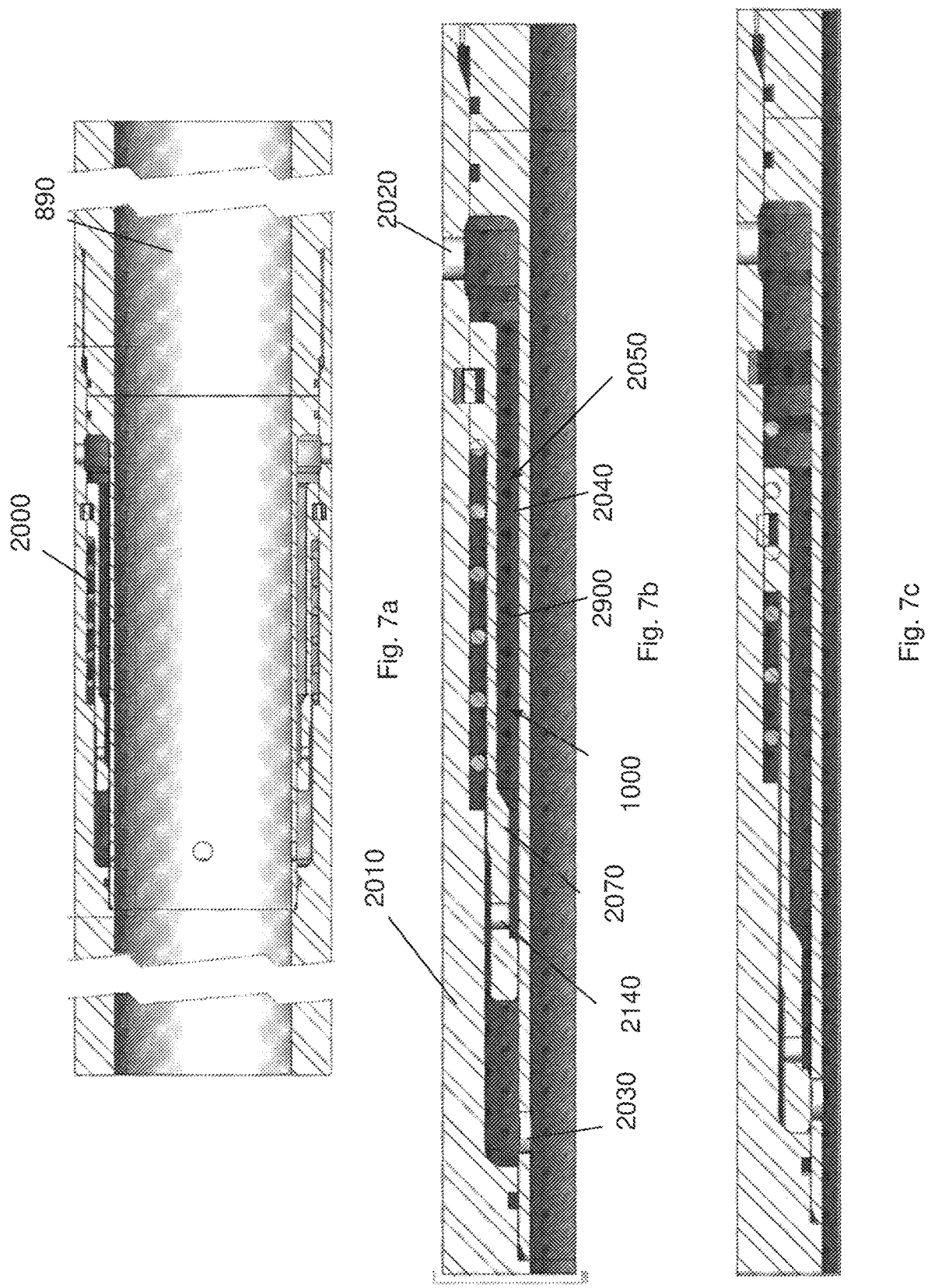

DOWNHOLE FLOW CONTROL DEVICES AND METHODS

CROSS-REFERENCE TO RELATED APPLICATIONS

This application is a national phase under 35 U.S.C. § 371 of PCT International Application No. PCT/GB2019/051721 which has an International filing date of Jun. 19, 2019, which claims priority to Great Britain Application No. 1810080.0, filed Jun. 19, 2018, the entire contents of each of which are hereby incorporated by reference.

FIELD

The disclosure relates to downhole flow control devices and uses thereof, principally in oil and gas operations.

In some particular examples, there are described flow control devices, apparatus (e.g. completion) and methods for use with fluid injection into formations to assist production.

BACKGROUND

In certain circumstances, it can be helpful to inject fluid into a formation in order to assist with hydrocarbon production. For example, in a carbonate reservoir, injector and producer wells may be used in combination whereby injection fluid, e.g. water, is introduced via an injector well in order to sweep oil through the formation towards the producer well.

However, difficulties exist where there is a significant contrast in relative permeability between regions of the formation through which injector fluid is intended to pass. In particular, and with reference to carbonate formations, there may be regions of relatively low permeability together with regions of relatively high permeability, e.g. at fractures, which may be considered to have near infinite permeability, relative to the remainder of the formation matrix. In such circumstances, injector fluid may essentially pass through those regions of high permeability, and bypass the oil residing in regions of low permeability.

There are a number of other similar circumstances in which a significant difference in permeability can cause preferential flow via regions of relative high permeability, and which may be undesirable. For example, "short cutting" of fluids may occur in sandstone formations in which thermal fractures have been induced (e.g. when introducing relatively cold fluids into hot rock formation). Similarly, water breakthrough in heavy oil or steam breakthrough in well using steam assisted gravity drainage (SAGD) may also exhibit undesirable fluid flow.

This background serves to set a scene to allow a skilled reader to better appreciate the following description. Therefore, none of the above discussion should necessarily be taken as an acknowledgement that that discussion is part of the state of the art or is common general knowledge.

SUMMARY

The disclosure relates to flow control devices (e.g. downhole devices) and uses thereof, principally in oil and gas operations. In some particular examples, there are described flow control devices, apparatus (e.g. completion or other such tubulars) and methods for use. In particular, the devices, methods and apparatus may be used in circumstances in which there exists a contrast (e.g. significant contrast) in relative permeability between regions of the formation through which fluid passes. The devices, apparatus and methods may assist with hydrocarbon recovery in such circumstances.

In some examples, there is described a flow control device. The flow control device may comprise a body locatable with a tubular. For example, the body may be locatable with a tubular such that the body portion may be configured to facilitate connection, e.g. threaded connection, with a complementary port in a wall of a tubular member, or the like. In other examples, the body may be locatable with a tubular in that it mounts with the exterior of the tubular, e.g. and is arranged such that a portion of the flow path is provided axially with respect to a tubular together with which it is arranged, as will be appreciated.

The flow control device may comprise a flow regulator, which may be housed within the body (e.g. within a cavity of the body). The flow regulator may define a flow path through the body. Such a flow path may accommodate fluid flow between internal and external locations of a tubular in use. Such a flow regulator may comprise a valve arrangement, which may form part of the flow path.

The flow regulator may additionally comprise a biasing mechanism, which may be configured to urge the valve arrangement towards an open configuration from a restricted configuration in which fluid flow though the flow path is restricted. Such a restricted configuration may include circumstances in which the valve arrangement may be considered to be in a closed configuration, e.g. fluid is not able to pass through the flow path of the device.

In some cases, the biasing mechanism and flow path through the flow control device may be configured such that a differential pressure acting across the flow regulator, in excess of a particular threshold, moves the valve arrangement from the open configuration towards the restricted configuration, e.g. in order to limit flow through the flow control device. In other words, from device to device, the flow path may be configured so as to provide a particular backpressure threshold, at which, that back pressure overcomes a biasing force in order to actuate the regulator.

In some examples, the flow path, e.g. the valve arrangement, may comprise one or more regions of flow restriction across the device (e.g. regions of reduced cross-sectional area), which are intended to perform a function of providing a back pressure. In some examples, the regions of restriction may be provided by flow ports, used to form part of the flow path through the device. In those examples, the configuration the flow ports (e.g. together with the biasing mechanism) may provide the particular pressure threshold required in order to move the regulator from the open configuration towards the restricted configuration.

In some examples, the device may comprise a valve seat configured to cooperate with the valve arrangement, e.g. when in a restricted (e.g. closed) configuration. For example, the device may be configured such that when in the restricted configuration the valve arrangement seals with the valve seat in order to stop flow through the device. In some examples, the device may comprise a nozzle disk mounted. The nozzle disk may be mounted within a pocket formed within the body. The nozzle disk may be configured to provide an exit of the flow path. In some examples, the nozzle disk comprises the valve seat.

It will also be appreciated that the device may be configured such that, in a restricted configuration, some flow is still permitted through the device. In those examples, the device may not comprise a sealing valve seat, as such, or may comprise a valve seat permitting a minor flow.

The device, or indeed the body of the device, may comprise a cavity. The biasing mechanism may be housed within the cavity, and optionally may be provided with a shroud arrangement configured to inhibit debris, or the like, from entering the biasing mechanism. In some examples, the device may comprise a sealing arrangement, specifically configured to seal the flow path from the biasing mechanism. That sealing arrangement may be provided by the shroud arrangement.

In some examples, the shroud arrangement may comprise two shroud members, which may be configured to provide a sliding arrangement, which may accommodate movement of the biasing mechanism, in use.

The device may be configured such that, when in a restricted configuration, the flow regulator moves back to an open configuration, when a differential pressure acting across the flow regulator reduces below the particular threshold. The device may be configured such that, flow is permitted only in one direction across the device.

The device may be configured such that, during normal expected operations, the device (e.g. flow ports, or other regions of restriction) need not provide any significant impedance to flow. In some examples, the device may be configured such that, during normal expected operation, the device provides functionality consistent with inflow control device, e.g. providing a restriction to the extent that flow is distributed during what may be considered to be normal flowing conditions. In such examples, the device may be considered to provide ICD functionality as well as functionality to provide flow restriction, when above a threshold, as described.

In some cases, the device may be configured to be locatable with an injection tubular for use in an injection well, e.g. so as to restrict injection fluid for passing from a tubular to a formation, when differential pressure acting across the flow regulator is in excess of the particular threshold. In some examples, the device may be configured to be locatable with a production tubular, e.g. for use together with an injection well. In such examples, the device may be configured so as to restrict injection fluid for passing from a formation to the tubular, when differential pressure acting across the flow regulator is in excess of the particular threshold.

In some described examples, there is provided a flow control device comprising:
  a body locatable with a tubular
  a flow regulator, housed within the body, the flow regulator defining a flow path through the body to accommodate flow between internal and external locations of a tubular in use,
  the flow regulator comprising a valve arrangement forming part of the flow path, and biasing mechanism configured to urge the valve arrangement towards an open configuration from a restricted configuration in which fluid flow though the flow path is restricted, wherein the biasing mechanism and flow path through the flow control device are configured such that a differential pressure acting across the flow regulator, in excess of a particular threshold, moves the valve arrangement from the open configuration towards the restricted configuration in order to limit flow through the flow control device.

In further examples, there is described a well tubular comprising one or more flow control devices as described above. The tubular may be confirmed to form a section of well completion, such as an injector or producer well completion. The tubular may further comprise a screen, positioned on an external surface of the tubular.

In some examples, there is described a method for controlling fluid flow, e.g. using downhole flow control devices, for example in oil and gas operations.

In some examples, the method may comprise providing a well tubular having one or more flow control devices for communicating fluid to/from a formation. For example, the method may comprise injecting/producing fluid from a formation. The method may further comprise controlling each device, and restricting flow through each device, when a differential pressure acting across that device is in excess of a particular threshold. The method may comprise selecting that particular threshold for a specific use, e.g. based on application.

The method may comprise controlling, autonomously, the or each device when a differential pressure acting across that device is in excess of a particular threshold.

The method may comprise controlling fluid flow in formations in which there is a contrast (e.g. a significant contrast) in relative permeability between regions of the formation through which fluid is intended to pass. The method may comprise controlling fluid flow in carbonate reservoirs. The method may comprise controlling fluid flow in carbonate reservoirs. The method may comprise controlling fluid flow in sandstone formations. The method may comprise controlling water breakthrough in heavy oil, and/or steam breakthrough in well using steam assisted gravity drainage (SAGD), or the like.

The disclosure includes one or more corresponding aspects, embodiments or features in isolation or in various combinations whether or not specifically stated (including claimed) in that combination or in isolation. Corresponding means for performing one or more of the discussed functions are also within the present disclosure. It will be appreciated that one or more embodiments/aspects may be useful in controlling fluids in regions of relative high contrast in permeability.

The above summary is intended to be merely exemplary and non-limiting.

BRIEF DESCRIPTION OF THE DRAWINGS

These and other aspects of the disclosure will now be described, by way of example only, with reference to the accompanying drawings, in which:

FIG. 3a shows a perspective assembly view of a flow control device according to an example; and FIG. 3b shows an exploded-view diagram of the flow control device of FIG. 3a;

FIG. 4a shows a perspective assembly view of a further example of a flow control device; and FIG. 4b shows an exploded-view diagram of that flow control device of FIG. 4a; and FIGS. 5a and 5b shows an example of a tubular comprising a flow control device according to an example;

FIGS. 6a and 6b show an example of a flow control device having a locking mechanism; and FIG. 7 shows a further example of a flow control device, provided with a tubular.

DETAILED DESCRIPTION OF THE DRAWINGS

Figure 1:
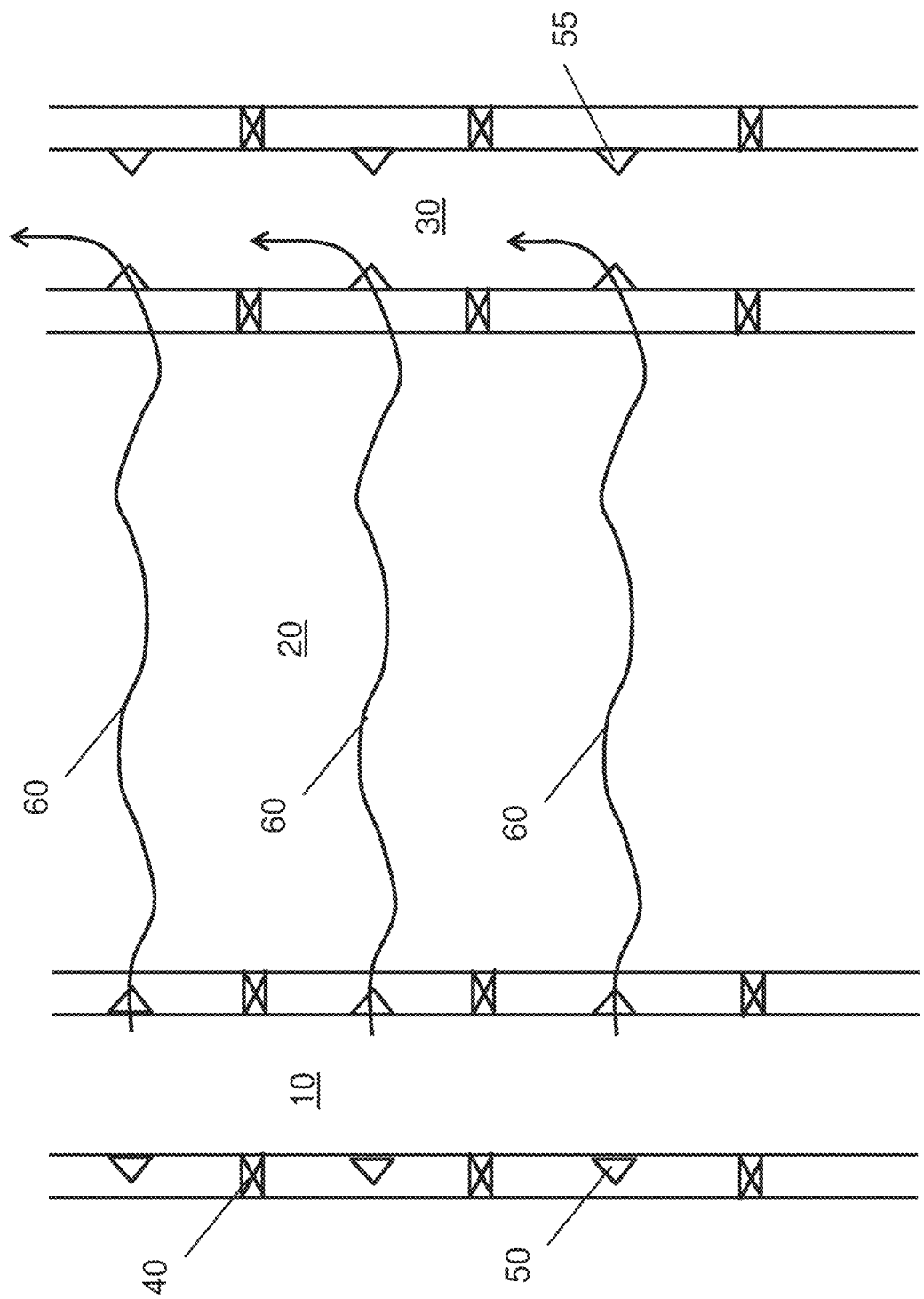
FIG. 1 is a simplified schematic representation of an injector well, formation and producer well.

FIG. 1 shows a simplified schematic representation of an injector well 10, hydrocarbon bearing formation 20 and producer well 30. In the following description, a single injector well 10 and producer well 30 are shown, but of course multiple injector/producer wells 10, 30 may be provided, as will be appreciated, which intersect the formation 20.

In such cases, injector wells 10 and producer wells 30 are used in combination in order to pump injection fluids 60, such as water, into the injector wells 10 so as to sweep oil through the formation 20 towards the producer well 30. In this particular case, the examples described relate to scenarios in which there may be a significant difference in relative permeability between regions of the formation 20 through which injection fluids 60 are intended to pass. For example, as may happen in carbonate reservoirs, there may be regions of relative low permeability generally through the expected carbonate matrix, and regions of high permeability, for example at fractures, through that same formation 20. As such, preferential fluid paths through those high permeability regions may be develop, which may provide insufficient backpressure and so cause injection fluids 60 to take a preferred, and likely undesirable, route along that high permeability path. In doing so, injection fluids 60 may preferentially pass through those few particular regions of the formation 20 which provide a low pressure/high permeability pathway for that fluid 60, significantly reducing production of hydrocarbons.

Of course, a skilled reader will appreciate that while the examples described here may be characterised with respect to injection in carbonate formations 20, nevertheless there will be many other similar circumstances in which a significant difference in permeability can cause preferential flow paths of fluids via regions of relative high permeability, and which may be undesirable in the operation of, or production from, hydrocarbon reservoirs. For example, similar preferential paths for fluids may occur in sand stone formations in which thermal fractures have been induced (e.g. when introducing relatively cold fluids into hot rock formation). Similarly, water breakthrough in heavy oil, or steam breakthrough in wells using steam assisted gravity drainage (SAGD) may also exhibit undesirable fluid flow. As such, the following devices and methods are not intended to be limited to use with injection, or carbonate formations, alone, and may be used in many different circumstances, as will be appreciated. A skilled reader will readily be able to implement those alternative embodiments accordingly.

In FIG. 1, both the injector well 10 and the producer well 30 have been constructed so as to provide zonal isolation along the sectional lengths of each of those wells 10, 30, e.g. using packers 40 or the like, in a known manner. Within each isolated zone shown at the injector well 10, flow outlets 50 are provided, which allow injection fluid 60 to be pumped from the injector well 10 through to the formation 20. Such flow outlets 50 may be provided by nozzles, or the like. Similarly, at the producer well 30, flow inlets 55 are provided, which allow injection fluid 60 to pass into producer well 30, and to surface, in an expected manner. Each flow outlet 50 may be configured similarly in so far the flow through the formation at each zone may be expected to the same or similar. Otherwise, some or all flow outlets 50 may be provided based on the expected formation 20 at that zone, e.g. the expected back pressure/permeability. The same is true of the flow inlets 55 at the producer well 30. It will also be appreciated that for each section of well tubular may comprise multiple outlets/inlets 50/55.

As mentioned, in some circumstances, for example in formations in which there occurs a significant contrast in relative permeability between regions or zones at that formation 20 through which injection fluid 60 is intended to pass, that injection fluid 60 may unhelpfully adopt a preferential path through those regions of high permeability, bypassing the oil residing in regions of low permeability. This may occur across the formation 20, and/or may occur at regions of particular high permeability contrast at the near wellbore, for example, which may otherwise prevent inflow from or outflow to the low permeability region.

Figure 2:
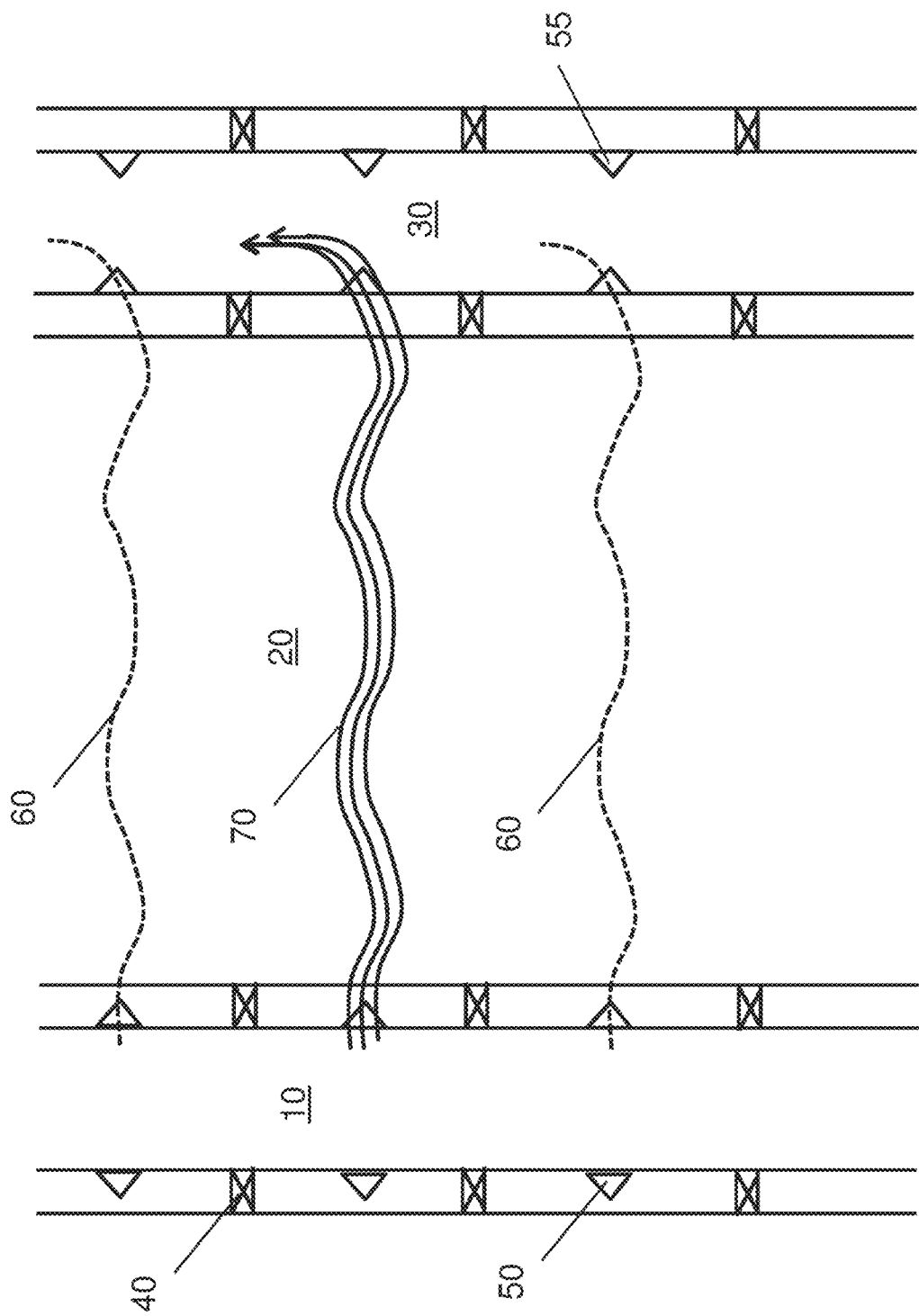
FIG. 2 is a simplified schematic representation of an injector well, formation and producer well similar to FIG. 1 in which a relatively high permeability flow path has formed.

FIG. 2 shows a simplified example in which there, in this example, there is a region of carbonate matrix in which a preferential flow path 70 of high permeability has formed (e.g. via a fracture). As will be appreciated, this path 70 may have formed prior to, or indeed during the injection process. In other words, in some cases, the path 70 may not have been anticipated when completing the wells 10, 30, and predicting the zonal isolation required. Further, it will be appreciated—although not shown—that there may also be regions of particular high permeability contrast at the near wellbore, which may reduce the ability to pass fluid through low permeability regions.

In light of these issues, consider now FIG. 3a, which shows a flow control device 100 for use in circumstances described above. The flow control device 100 is configured for use downhole and, as will be described in further detail below, the device 100 may be secured within the wall of a downhole tubular, such as a completion tubular, as you might expect on either of the injector or producer wells 10, 30. The described flow control devices 100 may provide, in use, a degree of flow control during flow conditions in which there is high contrast in permeability, e.g. across the intersected formation 20. In the present examples, flow control includes providing a restricting effect to the flow.

The flow control device 100 comprises a body 120 with an integrally formed head portion 140 and threaded portion 160, which can facilitate connection within a threaded port in a wall of a tubular member, or the like, as will be described in further detail below. The device 100 may additionally comprise a sealing arrangement 90, configured to seal the device 100 against a tubular or the like, when located therewith. The head portion 140 here comprises outer recessed regions 220, which provide an interface for a suitable tool, such as a wrench, to screw-tighten the device 100 into a threaded bore in a tubular. Reference is additionally made to FIG. 3b, which shows an exploded schematic view of the device 100 as is shown in FIG. 3a in which individual components are shown.

The device 100 includes a first opening arrangement 80 comprising a central axial port 180. An inflow area defined by the first opening arrangement 80 is intended to provide minimal restriction to flow when the device 100 is functioning in an open or flowing configuration, as will be further described. The device 100 further comprises a second opening arrangement 85, which in this particular example comprising a nozzle disk 240. In this example, the nozzle disk 240 defines a central nozzle orifice 260. Here, the nozzle disk 240 is mounted within a pocket 280 formed within the body 120 of the device 100. Further, the nozzle disk 240 comprises a valve seat 113 on an inward-facing surface thereof, i.e. facing towards the body 120 of the device 100.

The valve seat 113 is specifically configured to co-operate with a valve arrangement 107 of the device 100, as will be further described.

Here, the body 120 defines a cavity 300 therein, within which there is provided a flow regulator 105, and in this case a movable flow regulator 105. As will be further described, the flow regulator 105 defines a flow path through the body 120 to accommodate flow between first and second opening arrangements 80, 85, and internal and external locations of a tubular in use. The flow regulator 105 is specifically configured to provide an open configuration in which fluid flow normally through the device 100, and a restricted configuration in which fluid flow though the flow path is restricted, or indeed stopped, as will be described. In this sense, the term "restricted configuration" includes "closed configuration".

Here, the flow regulator 105 comprises the valve arrangement 107, which—in this example—comprises one or more flow ports 114 defined therein. Those flow ports 114 of the valve arrangement 107 form part of the flow path through the device 100. Here, the valve arrangement 107 comprises a plurality of flow ports 114 that extend in the radial direction from a central axis of the device 100—six flow ports 112 in the case, which are equally spaced circumferentially from one another. It will be appreciated that, in other examples, the device/regulator may comprise, not ports as such, but regions of flow restriction across the device (e.g. regions of reduced cross-sectional area), which are intended to perform a commensurate function to the ports (e.g. providing a back pressure, as will be described).

During normal expected operations, the flow ports need not provide any significant impedance to flow, or indeed may be configured to provide functionality consistent with inflow control device functionality, e.g. providing a restriction to the extent that flow is distributed during what may be considered to be normal flowing conditions. However, the specific configuration of the flow ports 114 are intended to provide a restriction (or further restriction) to flow when the flow rate through the device 100 is deemed excessive, and to provide a pressure drop across the valve arrangement 107, or otherwise backpressure at the ports 114—again, as will be described.

Here, the valve arrangement 107 of the regulator 105 is configured to move axially within the cavity 300 in use. At one location, the valve arrangement 107 is positioned towards the first opening arrangement 80, and as such the regulator 105 can be considered to be in the open configuration in which a flow path is formed from the first opening arrangement 80, through the valve arrangement 107 and the ports 114 therein, through the remainder of the cavity 300 formed in the body 120 and then out through the second opening arrangement 85. As mentioned, in this position, the device 100 does not necessarily provide a significant restriction to flow under normal operating conditions, or indeed may be configured to provide inflow control device functionality during normal flowing conditions. At another location, the valve arrangement 107 is moved, and in this example axially moved, so as to be positioned towards the second opening arrangement 85. In this location, the regulator 105 can be considered to be positioned in the restricted configuration. Further, at an extreme of that restricted configuration, the value arrangement 107 is positioned such that a sealing face 112 of the valve arrangement 107 seals with the valve seat 113 of, in this case, the nozzle disk 240 so as to restrict the flow of fluid through the device 100. It will be appreciated that the seal may provide a complete sealing effect (e.g. a complete metal-to-metal seal), or otherwise may provide a seal to the extent that flow is restricted through the device 100 (e.g. some minimal flow may be acceptable). Indeed, in some cases, it may be preferable to allow some flow through the device to continue even when in a restricted configuration, as this may assist with allowing the device to revert to the open configuration in use. Also, here, the sealing face 112 of the valve arrangement 107 has a chamfered or otherwise frustoconical profile. In such a way, sealing may be more easily effected, and can accommodate design or working tolerances.

Here, the flow regulator 105 further comprises a biasing mechanism 190 configured to urge the valve arrangement 107 towards the open configuration from the restricted configuration. Here, the biasing mechanism 190 is provided by a spring arrangement, and in particular a wave spring arrangement, which in this example is contained within the cavity 300 of the body 120. In this case, the biasing mechanism 190 is housed essentially between the nozzle disk 240 and a circumferential rib 106 extending from the valve arrangement 107.

Here, the device 100 further comprises a shroud arrangement 310 provided, within the cavity, and configured to inhibit debris from fluid flow passing through the device 100 from entering the biasing arrangement 190, when in use. It will be appreciated that in this example, the shroud arrangement 310 need not necessarily provide a seal for fluid, as such, but may be specifically configured to inhibit debris ingress. Of course, in some examples, the shroud arrangement 310 may indeed provide a sealing effect against fluid passing between the biasing mechanism and the flow path through the device 100. However, in this example, the shroud arrangement 300 comprises two shroud members 320, 330, that essentially co-operate in a sliding arrangement. In such a way, prevention of debris ingress may be provided to the biasing mechanism 190 within the cavity 300 even when the biasing mechanism 190 is extended or compressed, i.e. as the valve arrangement 107 moves within that cavity 300 in use. In this way, a torturous path is maintained that inhibits fluid/debris entering the biasing mechanism 190 (e.g. in a labyrinth-type configuration). Both shroud members 320, 330 in this example are provided by body inserts that provide axial extensions such that, in use, one axial extension overlaps and co-operates with the other axial extension. One shroud member 320 is configured to be positioned between the nozzle disk 240 and the biasing mechanism 190, while the other shroud member 330 is configured to be positioned between the rib 106 of the valve arrangement 107 and the biasing mechanism 190.

In use, flow control devices 100 such as those illustrated in FIGS. 3a and 3b may be secured within the wall of a tubular at the injector well 10 as shown in FIG. 1 or 2, e.g. at the flow outlet regions 50. Prior to installation, and running of the tubular, the flow control devices 100 may be configured such that a particular differential pressure acting across the flow regulator 105, in excess of a particular threshold, urges the valve arrangement from the open configuration towards the restricted configuration in order to limit flow through the flow control device 100. In particular, the specific configuration of biasing mechanism 190 and flow path through the device (e.g. the size/arrangement of the flow ports 114 of the valve arrangement 107, or the like) may be provided so as to configure the threshold above which the valve arrangement 107 begins to move towards to restricted configuration, and essential limited the rate of flow through the device.

In doing so, and in circumstances in which relative low pressure is experienced at a second opening arrangement 85 of a particular flow control device 100, e.g. at a region of the formation 20 that is exhibiting relatively high permeability, typically this may result in excess flow to begin to pass through the device 100. However, using the flow control devices 100 described, when a pressure drop occurs across the device 100 (in particular the valve arrangement 107) provides sufficient back pressure, the fluid can act essentially against the biasing mechanism 190 and can cause the flow regulator 105 to restrict, and in some cases stop, fluid flow passing through the device 100. As such, circumstances in which significant flow paths through regions of relative high permeability can be inhibited. However, injection fluid 60 flow through via other flow control devices 100 provides at different regions of the formation 20 will continue.

A skilled reader will appreciate that the flow control device 100 may be considered to act autonomously. In other words, when set and run into the well, the devices 100 can act according to the conditions in which they are positioned, rather than being manually actuated. In such a way, the devices 100 can respond to any unexpected developments of flow paths of high permeability at the formation.

A skilled reader will also appreciate that the particular threshold at which the flow restrictor 105 begins to move from the open to restricted configuration may vary from device to device 100 in a well 10, 30. Indeed, the combination of biasing mechanism 190 and flow path/restriction through the device/valve arrangement 107 may be selected based on desired device performance (e.g. responsive, etc. desired for the device). In some examples, particular dampening may be provided in order to induce a desired response profile to the onset of low pressure/high permeability.

While the flow control devices 100 have been described with reference to flow control from injector well 10 to formation 20, it may additionally or alternative be desired to control flow into the producer well 30 from regions of high permeability, or the like. In other words, it may additionally or alternatively be desirable to control inflow, in some circumstances.

It will also be appreciated that the device 100 may be configured such that the flow is permitted to pass through the device 100 in one direction only. In other words, while in some cases, the device 100 may permit flow back through the device 100 (e.g. from formation to tubular), in other circumstances the device 100 may not permit flow in such a direction. In those cases, the device may comprise a check valve arrangement, or the like, in order to restrict flow to one direction. A skilled reader will readily be able to implement such an embodiment accordingly.

Consider now FIG. 4a, which shows a further example of a flow control device 1000, which may be used in circumstances described above, e.g. restriction during inflow circumstances, such as those that may be present when injecting fluids through a formation 20. Here, again, the device 1000 may be secured within the wall of a downhole tubular, such as a completion tubular and may provide, in use, a degree of flow control during flow conditions in which there is high contrast in permeability, e.g. across the intersected formation 20, or indeed during undesired inflow above a flow rate during injection.

Again, the device 1000 comprises a body 1200 with an integrally formed head portion 1400 and threaded portion 1600, which can facilitate connection within a threaded port in a wall of a tubular member, or the like. A sealing arrangement 900 can be used to seal the device 1000 against a tubular or the like, when located therewith. Again, recessed regions 2200 may provide an interface for a suitable tool to allow the device 1000 to be mounted appropriately. FIG. 4b similarly shows an exploded schematic view of the components of the device 1000 as is shown in FIG. 4a. By comparison to FIGS. 3a and 3b, it will be apparent that the features of the flow regulator 105 have essentially been inverted.

Therefore, a first opening arrangement 800 having a central axial port 1800 may be essentially equivalent to the first opening arrangement 80 of the device of FIG. 3a/3b, but positioned on the alternate side of the body 1200. Similarly, the second opening arrangement 850 a nozzle disk 2400, having a central nozzle orifice 2600, but that that nozzle disk 2400 is mounted within a pocket 2800 formed on the alternate side of the device 1000. Again, however, the nozzle disk 2400 comprises a value seat 1130 on an inward-facing surface thereof, i.e. facing towards the body 1200 of the device 1000, which is specifically configured to co-operate with a valve arrangement 1070 of the device 1000, as will be further described.

Again, a cavity 3000 is provided, within which there is a flow regulator 1050 that defines a flow path through the body 1200 to accommodate flow between first and second opening arrangements 800, 850, and external and internal locations of a tubular in use. Similarly, the flow regulator 1050 comprises the valve arrangement 1070 having flow ports 1140 defined therein, which form part of the flow path through the device 1000, and where the valve arrangement 1070 is configured to move, against biasing mechanism 1900, in order to move from the regulator 1050 between open and restricted configurations. A similar shroud arrangement 3100 is provided having two cooperating shroud members 3200, 3300.

In use, flow control devices 1000 such as those illustrated in FIGS. 4a and 4b may be secured within the wall of a tubular, e.g. at the producer well 10 as shown in FIG. 1 or 2. For example, the device 1000 may be provided at one or more of the flow inlet regions 55. Prior to installation, and running of the tubular, the flow control devices 100 may be configured such that a particular differential pressure acting across the flow regulator 1050, in excess of a particular threshold, urges the valve arrangement 1070 from the open configuration towards the restricted configuration in order to limit flow through the flow control device 1000. Again, the specific configuration of biasing mechanism 1900 and flow path through the device 1000 (e.g. the size/arrangement of the flow ports 1140 of the valve arrangement 1070, or the like) may be provided so as to configure the threshold above which the valve arrangement 1070 begins to move towards to restricted configuration.

In doing so, and in circumstances in which relative pressure drop occurs across the device 1000 (in particular the valve arrangement 1070) provides sufficient back pressure, the fluid can act essentially against the biasing mechanism 1900 and can cause the flow regulator 1050 to restrict, and in some cases stop, fluid flow passing through the device 1000.

Again, it will be appreciated that the flow control device 1000 may be considered to act autonomously. It will also be appreciated that the device 1000 of FIG. 4a/4b may be used in conjunction with the device 100 of FIG. 3a/3b, e.g. during injection/production operations, or indeed the devices 100, 1000 may be used independently depending on particular circumstances, and a skilled reader will readily be able to implement those alternative embodiments accordingly.

It will also be appreciated that the devices 100/1000 can be used in many additional circumstances in which flow, up to a threshold, may be accommodated, but then above that threshold the valve arrangement essentially closes to restrict the flow. It will also be appreciated that the devices 100/1000 can be used for flow in both directions. However, any blocking of flow will only occur in one direction and only when the pressure force acting on the flow regulator is in excess of a particular threshold, for which the device 100/1000 may have been configured.

It will also be appreciated that in many circumstances, the flow control devices 100, 1000 may not be in direct communication with the formation 20, as such, but may be mounted on a tubular 890, e.g. completion tubing, in which a screen 450 or other such cover/filter media is provided. FIG. 5a shows an example of a device 1000 mounted with a tubular in which an outer screen 450 is provided. FIG. 5b shows in more detail the device 100/1000 positioned with a section of screen 450. In this example, the device 100/1000 is mounted within the wall of the tubular. Here, the device 100 is configured in a similar manner to that shown in FIG. 3a/3b, i.e. to control outflow from the tubular to the formation 20, e.g. during injection procedures. Relative to the orientation of the tubular, fluid passes radially out through the tubular, and then axially along a section of the tubing, and the again radially out through the screen 450. A similar configuration may be used in reverse for the device of FIG. 4a/4b.

In some examples, it may be helpful if the devices 100/1000 are activated after a period of time, or when certain conditions present themselves downhole. For example, it may be desirable for the device 100/1000 to be run with completions, but only to activate in certain circumstances, e.g. in the presence of injection fluid, such as water. Consider now FIGS. 6a and 6b, which provide simplified cross-sectional illustrations of a device 1000 similar to that described in relation to FIG. 4a/4b. Here, however, the device 100/1000 additional comprises a locking mechanism 500. The locking mechanism 500 is specifically configured to retain the flow regulator in particular position, i.e. relative to the body. This is shown in FIG. 6a. It may be that the locking mechanism is provided by a shear pin/ring, or the like, that shears when the backpressure reaches a particular threshold. Otherwise, in this example, a swellable material may be provided such that, when exposed to particular type of fluid (e.g. water), begins to swell and unlatch the flow regulator 105/1050 to allow it to move, as is shown in FIG. 6b.

FIGS. 7a, 7b and 7c show a further example of a flow control device 2000. In this case, the flow control device 2000 comprises similar components as described above, but is arranged such that the flow path is provided axially with respect to a tubular 890 together with which it is arranged. In this example, the device 2000 shown may be considered to function similar to that shown in FIG. 4a/4b, e.g. restriction during inflow circumstances.

Again, the device 2000 comprises a body 2010, which is mountable with the tubular 890. FIGS. 7b and 7c show the device 2000 in an open configuration and a restricted configuration, respectively. Again, the device 2000 comprises a first opening arrangement 2020 and a second opening arrangement 2030. Again, a cavity 2040 is provided, within which there is a flow regulator 2050 that defines a flow path through the body 2010 to accommodate flow between first and second opening arrangements 2020, 2030, and external and internal locations of a tubular 890 in use. Similarly, the flow regulator 2050 comprises the valve arrangement 2070 having flow ports 2140 defined therein, which form part of the flow path through the device 2000, and where the valve arrangement 2070 is configured to move, against a biasing mechanism 2900, in order to move from the regulator 2050 between open and restricted configurations—in this case, axially move relative to the tubular 890—such that the flow path to the second open configuration is sealed.

A skilled reader will appreciate that while the above examples have been described with respect to injector/producer well, and in particular carbonate formations, nevertheless the same methods and devices may be used in other such circumstances in which a contrast (e.g. a significant contrast) in relative permeability between regions of the formation through which fluid is intended to pass. In such circumstances, fluid may essentially preferentially pass through those regions of high permeability, bypassing the oil residing in regions of low permeability. Such effects may also occur, for example, in fluids passing through sandstone formations, water breakthrough in heavy oil or steam breakthrough in well using steam assisted gravity drainage (SAGD), or the like. A skilled reader will readily be able to implement the methods and devices according to specific application.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the disclosure may consist of any such individual feature or combination of features. In view of the foregoing description it will be evident to a person skilled in the art that various modifications may be made within the scope of the invention.

The invention claimed is:

1. A flow control device comprising:
a body locatable with a tubular,
a flow regulator, housed within the body, the flow regulator defining a flow path through the body to accommodate flow between internal and external locations of a tubular in use,
the flow regulator comprising a valve arrangement forming part of the flow path, and a biasing mechanism configured to urge the valve arrangement towards an open configuration from a restricted configuration in which fluid flow through the flow path is restricted,
wherein the biasing mechanism and flow path through the flow control device are configured such that a differential pressure acting across the flow regulator, in excess of a particular threshold, moves the valve arrangement from the open configuration towards the restricted configuration in order to limit flow through the flow control device,
wherein the biasing mechanism is provided with a shroud arrangement, the shroud arrangement comprising a plurality of shroud members,
wherein each of the shroud members comprise an axial extension, such that when the shroud members are configured to cooperate in sliding arrangement, the axial extensions of the shroud members overlap to maintain a tortuous path in a labyrinth configuration that inhibits fluid/debris entering the biasing mechanism.

2. The flow control device according to claim 1, wherein the valve arrangement comprises one or more flow ports forming part of the flow path through the device, and the configuration of the biasing mechanism and the flow ports provides the particular threshold required in order to move the regulator from the open configuration towards the restricted configuration.

3. The flow control device according to claim 2, wherein the device is configured such that when in the restricted configuration the valve arrangement seals with a valve seat in order to stop flow through the device.

4. The flow control device according to claim 3 wherein the device comprises a nozzle disk mounted within a pocket formed within the body, and providing an exit of the flow path, and wherein the nozzle disk comprises the valve seat.

5. The flow control device according to claim 1, wherein the body comprises a cavity, within which is housed the flow regulator.

6. The flow control device according to claim 5, wherein the biasing mechanism is housed within the cavity.

7. The flow control device according to claim 6, wherein the shroud arrangement comprises two shroud members.

8. The flow control device according to claim 1, wherein, when in a restricted configuration, the device is configured to move back to an open configuration, when the differential pressure acting across the flow regulator reduces below the particular threshold.

9. The flow control device according to claim 1, wherein the body of the device is configured to be locatable with an injection tubular for use in an injection well, so as to restrict injection fluid for passing from a tubular to a formation, when differential pressure acting across the flow regulator is in excess of the particular threshold.

10. The flow control device according to claim 1, wherein the body of the device is configured to be locatable with a production tubular, for use together with an injection well, and is configured so as to restrict injection fluid for passing from a formation to the tubular, when differential pressure acting across the flow regulator is in excess of the particular threshold.

11. A well tubular comprising one or more flow control devices according to claim 1.

12. The tubular according to claim 11, wherein tubular is configured to form a section of injector well completion.

13. The tubular according to claim 11, further comprising a screen, positioned on an external surface of the tubular.

14. A method for controlling fluid flow when injecting fluids into a formation, comprising:
- providing a well tubular having one or more flow control devices for injecting fluid into a formation or for producing fluid from a formation, each of the one or more flow control devices including
- a body locatable with a tubular,
- a flow regulator, housed within the body, the flow regulator defining a flow path through the body to accommodate flow between internal and external locations of a tubular in use,
- the flow regulator comprising a valve arrangement forming part of the flow path, and a biasing mechanism configured to urge the valve arrangement towards an open configuration from a restricted configuration in which fluid flow through the flow path is restricted, wherein the biasing mechanism and flow path through the flow control device are configured such that a differential pressure acting across the flow regulator, in excess of a particular threshold, moves the valve arrangement from the open configuration towards the restricted configuration in order to limit flow through the flow control device, wherein the biasing mechanism is provided with a shroud arrangement, the shroud arrangement comprising a plurality of shroud members,
- wherein each of the shroud members comprise an axial extension, such that when the shroud members are configured to cooperate in sliding arrangement, the axial extensions of the shroud members overlap to maintain a tortuous path in a labyrinth configuration that inhibits fluid/debris entering the biasing mechanism;
- controlling each device and restricting flow through each device when a differential pressure acting across that device is in excess of a particular threshold, such that each device is configured to move from the open configuration to the restricted configuration.

15. The method according to claim 14, wherein the devices are configured to be controlled autonomously when a differential pressure acting across that device is in excess of a particular threshold.

16. A method for controlling fluid flow when injecting fluids into a formation, comprising:
- locating one or more flow control devices for injecting fluid into a formation or producing fluid from a formation with a well tubular, wherein each of the one or more flow control devices is locatable with the tubular via a body;
- housing a flow regulator and a biasing mechanism within a cavity defined within the body of each of the one or more flow control devices;
- providing the well tubular in a formation;
- controlling each device and restricting flow through each device via the flow regulator when a differential pressure acting across that device is in excess of a particular threshold, wherein the flow regulator defines a flow path through the body to accommodate flow between internal and external locations of the tubular in use, the flow regulator further comprising a valve arrangement forming part of the flow path;
- biasing the valve arrangement towards an open configuration from a restricted configuration in which fluid flow through the flow path is restricted via the biasing mechanism, wherein the biasing mechanism and flow path through the flow control device are configured such that a differential pressure acting across the flow regulator, in excess of a particular threshold, moves the valve arrangement from the open configuration towards the restricted configuration in order to limit flow through the flow control device, and wherein the biasing mechanism is provided with a shroud arrangement, the shroud arrangement comprising a plurality of shroud members,
- wherein each of the shroud members comprise and axial extension, such that when the shroud members are configured to cooperate in sliding arrangement, the axial extensions of the shroud members overlap to maintain a tortuous path in a labyrinth configuration that inhibits fluid/debris entering the biasing mechanism; and
- sealing the biasing mechanism from the flow path with a shroud arrangement.

* * * * *